United States Patent Office 3,227,708
Patented Jan. 4, 1966

3,227,708
TRIFLUOROMETHYL PHENOTHIAZINES
Harry Louis Yale, New Brunswick, Francis Alexander Sowinski, Nixon, and Jack Bernstein, New Brunswick, N.J., assignors to Olin Mathieson Chemical Corporation, New York, N.Y., a corporation of Virginia
No Drawing. Filed Sept. 11, 1957, Ser. No. 683,219
3 Claims. (Cl. 260—243)

This application is a continuation-in-part of application Serial No. 597,325, filed July 12, 1956, now abandoned, which in turn is a continuation-in-part of application Serial No. 554,936, filed December 23, 1955, now abandoned.

This invention relates to new 10-(oxygenated-piperazino) - lower alkyl - trifluoromethylphenothiazines (and their salts) having valuable therapeutic properties and processes for the preparation thereof.

The therapeutically active compounds of this invention include phenothiazines of the general formula

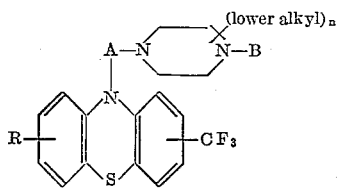

wherein A is a lower alkylene radical, B is hydroxy-lower alkyl, hydroxy-(lower alkoxy)-lower alkyl, esters thereof, or carbalkoxy, R is hydrogen, halogen, lower alkyl, lower alkoxy, or trifluoromethyl, and $n$ is zero, one or two; and salts thereof. Among the suitable radicals represented by the symbol B are: hydroxy-lower alkyl (e.g., hydroxyethyl, hydroxyisopropyl and hydroxypropyl); esters thereof, particularly lower alkanoic acid esters (e.g., acetoxyethyl, propionyloxypropyl and hexanoyloxybutyl); hydroxy-(lower alkoxy)-lower alkyl [e.g., hydroxyethoxyethyl ($HO—CH_2CH_2OCH_2CH_2—$), hydroxypropoxyethyl and hydroxyisopropoxypropyl]; esters thereof, particularly lower alkanoic acid esters (e.g., acetoxyethoxyethyl); and carbalkoxy, particularly carbo(loweralkoxy), e.g., carbomethoxy, carbethoxy and carbopropoxy. The terms "lower alkyl," "lower alkoxy" and "lower alkylene," as employed herein, include both straight and branched chain radicals of less than eight carbon atoms. The particularly preferred compounds are those wherein the trifluoromethyl radical is in the 2-position; A is a lower alkylene radical of two to three carbon atoms (i.e., ethylene, trimethylene-1,3 and propylene-1,2); B is hydroxyl(lower alkyl) or an ester thereof; R is hydrogen; and $n$ is zero.

As to the salts of the phenothiazines, those coming within the purview of this invention include the acid-addition salts, particularly the non-toxic acid-addition salts. Acids useful for preparing the acid-addition salts include, inter alia, inorganic acids such as the hydrohalic acids (e.g., hydrochloric and hydrobromic acid), sulfuric acid, nitric acid and phosphoric acid, and organic acids such as oxalic, tartaric, citric, acetic, maleic and succinnic acid, theophylline and 8-chlorotheophylline.

The 10 - oxygenated-piperazino-lower alkyl-trifluoromethylphenothiazines of this invention and the acid-addition salts thereof are therapeutically active compounds which are utilizable as antihistaminic and especially transquilizing (or ataractic) agents. These compounds are unique in the series of trifluoromethylphenothiazines in that they possess tranquilizing activity more than five times greater than the corresponding 10-di(lower alkyl)amino-lower alkyl derivatives. Thus, 10-($N^4$-hydroxyethylpiperazinopropyl) - 2-trifluoromethylphenothiazine hydrochloride can be administered perorally in the same manner as 10-(3-dimethylaminopropyl)-2-trifluoromethylphenothiazine hydrochloride in the treatment of certain psychotic states. The dosage for such treatment must, of course, be adjusted for the activity of the particular compound.

The compounds of this invention can be prepared by one of the processes of this invention, namely, by reacting a trifluoromethylphenothiazine with a piperazino-(lower alkanoyl)halide, thereby forming the 10-piperazinoalkanoyl derivative, which is then reduced, as by treatment with lithium aluminum hydride, to the piperazinoalkyl derivative. These compounds can also be formed by reacting a trifluoromethylphenothiazine with a halo-acyl halide (e.g., α-chloroacetyl chloride) and the resulting 10-halo-acyl derivative then either reacted with an appropriate piperazine and the resulting 10-piperazino-acyl derivative reduced to yield the 10-piperazinoalkyl derivative; or first reduced and then aminated. Another method for preparing the compounds of this invention, wherein the trifluoromethyl radical is in the 2 or 4 position, entails the reaction of 2- (or 4-) trifluoromethylphenothiazine with a compound of the formula:

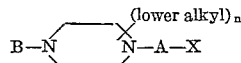

wherein B, A and $n$ are as hereinbefore defined and X is halogen (e.g., iodine, bromine and preferably chlorine), in the presence of an acid acceptor, such as an alkali metal, an alkali metal alcoholate, an alkali metal hydride, an organic lithium derivative, such as butyl lithium, and preferably an alkali metal amide (e.g., sodamide). Still another, and the preferred, method for preparing the compounds of this invention is by reacting a 10-halo-(lower alkyl)-trifluoromethylphenothiazine with the desired substituted piperazine in an organic solvent, such as methyl ethyl ketone, preferably in the presence of a metal iodide, such as an alkali iodide. The desired 10-halo(lower alkyl)-trifluoromethylphenothiazine may be prepared by the standard methods from the corresponding alcohol, or by the alkylation of the trifluoromethylphenothiazine with a dihalogenated lower alkane, the halogen atoms being different (e.g., trimethyl chlorobromide).

The 10-(oxygenated-piperazino)-lower alkyl-trifluoromethylphenothiazines of this invention may be converted into or obtained as the corresponding S-monoxide or corresponding 5,5-dioxide. To prepare the S-monoxide, the corresponding 10 - (oxygenated-piperazino) - lower alkyl-trifluoromethylphenothiazine is treated with an equivalent amount of an oxidizing agent such as hydrogen peroxide or a peracid such as peracetic acid. To prepare the corresponding 5,5-dioxides of the compounds of this invention, the desired phenothiazine nucleus, before addition of the 10 - (oxygenated-piperazino)-lower alkyl side chain and after protection of the 10-nitrogen atom by acylation, is treated with an oxidizing agent to form the 5,5-dioxide, the acyl group is then removed, and the resulting phenothiazine - 5,5 - dioxide nucleus treated as described hereinbefore to yield the 10-(oxygenated-piperazino)-lower alkyl-trifluoromethylphenothiazine final product.

The free bases, when initially formed, can be converted to acid-addition salts by treatment with the desired acid. This reaction is preferably conducted in an inert organic solvent under substantially anhydrous conditions by treating the base with the acid, whereby the acid-addition salt is formed.

The following examples illustrate the invention (all temperatures being in centigrade):

EXAMPLE 1

*10-[3-(N⁴-carbethoxypiperazino)propyl]-2-trifluoromethylphenothiazine oxalate*

(a) PREPARATION OF 10 - [3 - (2 - TETRAHYDROPYRANYLOXY)PROPYL] - 2 - TRIFLUOROMETHYLPHENOTHIAZINE

A mixture of 27.6 g. of 2-trifluoromethylphenothiazine, 4.7 g. of sodamide, 20 g. of 3-(2-tetrahydropyranyloxy) propyl chloride and 500 ml. of dry xylene is stirred and refluxed for 150 hours, filtered hot and the filtrate concentrated in vacuo. The residue is dissolved in one liter of boiling Skellysolve E, the hot solution treated with Darco and Hyflo and filtered hot. The filtrate is cooled and the unreacted 2-trifluoromethylphenothiazine which crystallizes is filtered off. The filtrate is then concentrated and the residue distilled to give about 20 g. of product, B.P. about 190–220°/0.2 mm.

(b) PREPARATION OF 10-(3-HYDROXYPROPYL)-2-TRIFLUOROMETHYLPHENOTHIAZINE

To a solution of 26 g. of 10[3-(2-tetrahydropyranyloxy)propyl]-2-trifluoromethylphenothiazine in 200 ml. of boiling 95% ethanol is added 6 ml. of concentrated hydrochloric acid and the mixture refluxed for one hour. The alcohol is distilled off and the residue extracted with ether. The ether extracts are dried and concentrated to give about 17.6 g. of 10-(3-hydroxypropyl)-2-trifluoromethylphenothiazine.

(c) PREPARATION OF 10-(3-CHLOROPROPYL)-2-TRIFLUOROMETHYLPHENOTHIAZINE

To 17.6 g. of 10-(3-hydroxypropyl)-2-trifluoromethylphenothiazine in 175 ml. of dry benzene is added dropwise a solution of 8.1 g. of thionyl chloride in 25 ml. of dry benzene while the solution is diffused with nitrogen. The reaction mixture is then stirred and refluxed for one hour, cooled, washed with dilute aqueous sodium bicarbonate solution, dried, concentrated and distilled to give about 12 g. of product boiling at about 170–172° at 0.4 mm.

(d) PREPARATION OF 10 - [3 - (N⁴ - CARBETHOXYPIPERAZINO)PROPYL] - 2 - TRIFLUOROMETHYLPHENOTHIAZINE

A mixture of 15 g. of 10-(3-chloropropyl)-2-trifluoromethylphenothiazine and 20.7 g. of 1-carbethoxypiperazine is allowed to react at room temperature for seven days. The semi-crystalline mass is then suspended in 250 ml. of 0.8 N hydrochloric acid and extracted with three 250-ml. portions of ether. The aqueous phase is then made basic with a slight excess of 20% sodium hydroxide and the product extracted with two 250-ml. portions of ether. The ether extracts are combined, dried and concentrated to give a residual oil. This oil is partitioned between dilute hydrochloric acid and ether, and the aqueous layer than made alkaline and extracted with ether. The ether extracts are dried and concentrated and the residue distilled to give about 7 g. of product boiling at about 230–240° at 0.25 mm.

(e) PREPARATION OF 10 - [3 - (N⁴ - CARBETHOXYPIPERAZINO)PROPYL] - 2 - TRIFLUOROMETHYLPHENOTHIAZINE OXALATE

To a solution of 2.5 g. of 10-[3-(N⁴-carbethoxypiperazino)propyl]-2-trifluoromethylphenothiazine in 10 ml. of acetonitrile is added a solution of 2.4 g. of anhydrous oxalic acid in acetonitrile. Anhydrous ether is then added to the point of incipient precipitation and the solution cooled to yield about 1.7 g. of product melting at about 174–175°.

EXAMPLE 2

*10-[3-(N⁴-carbomethoxypiperazino)propyl]-2-trifluoromethylphenothiazine oxalate*

By substituting 18.7 g. of 1-carbomethoxypiperazine for the 1-carbethoxypiperazine in step *d* of Example 1 and otherwise following the procedure of Example 1, there is obtained 10-[3-(N⁴-carbomethoxypiperazino)propyl]-2-trifluoromethylphenothiazine oxalate.

EXAMPLE 3

*10-[2-(N⁴-carbethoxypiperazino)propyl]-2-trifluoromethylphenothiazine oxalate*

By substituting 20 g. of 2-(2-tetrahydropyranyloxy)propyl chloride for the 3-(2-tetrahydropyranyloxy)propyl chloride in step *a* of xample 1 and otherwise following the procedure of Example 1, there is obtained 10-[2-(N⁴-carbethoxypiperazino)propyl] - 2 - trifluoromethylphenothiazine oxalate.

EXAMPLE 4

*10-[3-(N⁴-carbethoxypiperazino)propyl]-4-trifluoromethylphenothiazine oxalate*

By substituting 27.6 g. of 4-trifluoromethylphenothiazine for the 2-trifluoromethylphenothiazine in step *a* of Example 1 and otherwise following the procedure of Example 1, there is obtained 10-[3-(N⁴-carbethoxypiperazino)propyl]-4-trifluoromethylphenothiazine oxalate.

EXAMPLE 5

*10-[3-(N⁴-hydroxyethylpiperazino)propyl]-2-trifluoromethylphenothiazine dihydrochloride*

(a) PREPARATION OF 10-(3-CHLOROPROPYL)-2-TRIFLUOROMETHYLPHENOTHIAZINE

A mixture of 26.7 g. of 2-trifluoromethylphenothiazine, 4.7 g. of sodamide and 18.8 g. of trimethylene chlorobromide in 500 ml. of dry xylene is heated under reflux for 12 hours in an atmosphere of dry nitrogen. The reaction mixture is then filtered and concentrated and the residue distilled under reduced pressure to give about 20.2 g. of 10-(3-chloropropyl)-2-trifluoromethylphenothiazine, B.P. about 190° at 0.9 mm.

(b) PREPARATION OF 10 - [3 - (N⁴ - HYDROXYETHYLPIPERAZINO)PROPYL] - 2 - TRIFLUOROMETHYLPHENOTHIAZINE

A mixture of 20.2 g. of 10-(3-chloropropyl)-2-trifluoromethylphenothiazine, 34.4 g. of 1-piperazineethanol, 8.9 g. of sodium iodide and 250 ml. of methyl ethyl ketone are refluxed with stirring for eight hours. The solvent is removed by distillation under reduced pressure and the residue extracted with dilute hydrochloric acid. The acid extracts are filtered, washed with ether and the base liberated by the addition of solid potassium carbonate. The liberated base is extracted with ether and the ether extract dried and concentrated. The residue is distilled under reduced pressure and gives about 20 g. of product boiling at about 226–233° at 0.2 mm.

(c) PREPARATION OF 10 - [3 - (N⁴ - HYDROXYETHYLPIPERAZINO)PROPYL] - 2 - TRIFLUOROMETHYLPHENOTHIAZINE DIHYDROCHLORIDE

A solution of 5.4 g. of 10-[3-(N⁴-hydroxyethylpiperazino)propyl]-2-trifluoromethylphenothiazine in 20 ml. of dry acetonitrile is treated wtih an excess of ethereal hydrogen chloride. The hydrochloride salt is filtered and recrystallized twice from absolute ethanol to give the desired dihydrochloride melting at about 235–237°.

EXAMPLE 6

*10-[3-(N⁴-hydroxyisopropylpiperazino)propyl]-2-trifluoromethylphenothiazine dihydrochloride*

By substituting 38 g. of 1-piperazineisopropanol for the 1-piperazineethanol in step *b* of Example 5 and otherwise following the procedure of Example 5, there is obtained 10-[3-(N⁴-hydroxyisopropylpiperazino)propyl]-2-trifluoromethylphenothiazine dihydrochloride.

EXAMPLE 7

*10-[3-(N⁴-hydroxyethylpiperazino)propyl]-8-methyl-2-trifluoromethylphenothiazine dihydrochloride*

By substituting 28.1 g. of 8-methyl-2-trifluoromethyl phenothiazine for the 2-trifluoromethylphenothiazine in step *a* of Example 5 and otherwise following the procedure of Example 5, there is obtained 10-[3-(N⁴-hydroxyethylpiperazino) - propyl] - 8 - methyl-2-trifluoromethylphenothiazine dihydrochloride.

EXAMPLE 8

*10-[3-(2,5-dimethyl-4-hydroxyethylpiperazino)propyl]-trifluoromethylphenothiazine dihydrochloride*

By substituting 42.1 g. of 2,5-dimethyl-1-piperazine ethanol for the 1-piperazineethanol in step *b* of Example 5 and otherwise following the procedure of Example 5, there is obtained 10-[3-(2,5-dimethyl-4-hydroxyethyl piperazino)propyl]-2-trifluoromethylphenothiazine dihydrochloride.

EXAMPLE 9

*10[3-(N⁴-acetoxyethylpiperazino)propyl]-2-trifluoromethylphenothiazine dihdrochloride*

To a solution of 7 g. of 10-[3-(N⁴-hydroxyethylpiperazino)propyl]-2-trifluoromethylphenothiazine in 80 ml. of dry chloroform is added dropwise a solution of 1.4 g. of acetyl chloride in 30 ml. of dry chloroform. The reaction mixture is stirred and kept at about 0° by cooling during the addition. The reaction mixture is stirred for 30 minutes after the addition of the acetyl chloride is completed and then 8.2 ml. of 4 N ethereal hydrogen chloride is added. The precipitated salt is filtered, washed with anhydrous ether and recrystallized from isopropanol to give about 6.8 g. of product melting at about 233–235°.

EXAMPLE 10

*10-[3-(N⁴-propionyloxyethylpiperazino)propyl]-2-trifluoromethylphenothiazine dihydrochloride*

By substituting 1.6 g. of propionyl chloride for the acetyl chloride in the procedure of Example 9, there is obtained 10 - [3 - (N⁴-propionyloxyethylpiperazino)propyl]-2-trifluoromethylphenothiazine dihydrochloride.

EXAMPLE 11

*10-[3-(N⁴-hydroxyethoxyethylpiperazino)propyl]-2-trifluoromethylphenothiazine dihydrochloride*

(*a*) PREPARATION OF N-HYDROXYETHOXYETHYL-PIPERAZINE

To 23 g. of finely divided sodium suspended in 300 ml. of dry xylene is added slowly with vigorous stirring 130 g. of N-hydroxyethylpiperazine. The reaction mixture is warmed on a steam bath until the evolution of hydrogen ceases and all the sodium has reacted. To this solution is then added dropwise with vigorous stirring 81 g. of 2-chloroethanol. The mixture is stirred vigorously and the heating continued during the addition of the 2-chloro ethanol and for two hours after the addition is complete. The reaction mixture is then cooled, the sodium chloride filtered off and the residue, after removal of the xylene by distillation, is fractionally distilled under reduced pressure to give the desired N-hydroxyethoxyethylpiperazine.

(*b*) PREPARATION OF 10 - [3 - (N⁴ - HYDROXYETHOXY-ETHYLPIPERAZINO)PROPYL] - 2 - TRIFLUOROMETH-YLPHENOTHIAZINE

A mixture of 34.5 g. of 10-(3-chloropropyl)-2-trifluoro methylphenothiazine, 52 g. of N-hydroxyethoxyethylpiperazine, 15 g. of sodium iodide and 500 ml. of methyl ethyl ketone is refluxed with stirring for eight hours. The methyl ethyl ketone is removed by distillation under reduced pressure and the residue suspended in dilute hydrochloric acid. The mixture is filtered to remove insoluble material and the filtrate washed several times with ether. The acid solution is then saturated with solid potassium carbonate. The liberated base is extracted with ether, the ether extracts combined, dried and concentrated. The residue is distilled under reduced pressure to give the desired product.

(*c*) PREPARATION OF 10 - [3 - (N⁴ - HYDROXYETHOXY-ETHYLPIPERAZINO)PROPYL] - 2 - TRIFLUOROMETH-YLPHENOTHIAZINE DIHYDROCHLORIDE

A solution of 9.5 g. of 10-[3-(N⁴-hydroxyethoxyethylpiperazino)propyl]-2-trifluoromethylphenothiazine in 50 ml. of dry acetonitrile is treated with an excess of ethereal hydrogen chloride. The precipitated dihydrochloride salt is filtered and recrystallized from absolute ethanol to give the desired dihydrochloride.

EXAMPLE 12

*10[3-(N⁴-acetoxyethoxyethylpiperazino)propyl]-2-trifluoromethylphenothiazine dihydrochloride*

A solution of 9.6 g. of 10-[3-(N⁴-hydroxyethoxyethylpiperazino)propyl]-2-trifluoromethylphenothiazine in 150 ml. of dry chloroform is cooled to 0° and, with stirring and cooling, there is added dropwise a solution of 1.6 g. of acetyl chloride in 30 ml. of dry chloroform. The reaction mixture is stirred for an additional thirty minutes after the addition is completed and then an excess of ethereal hydrogen chloride is added. The precipitated salt is filtered, washed thoroughly with anhydrous ether and recrystallized from isopropanol to give the desired product.

The invention may be otherwise variously embodied within the scope of the appended claims.

What is claimed is:

1. 10 - halo-(lower alkyl)-2-trifluoromethlphenothiazine, wherein the halo has an atomic number greater than 9.

2. 10 - (3 - chloropropyl)-2-trifluoromethylphenothiazine.

3. 10 - (3 - halopropyl) - 2-trifluoromethylphenothiazine, wherein the halo has an atomic number greater than 9.

References Cited by the Examiner

UNITED STATES PATENTS

| 2,587,660 | 3/1952 | Smith | 260—243 |
| 2,645,640 | 7/1953 | Charpentier | 260—243 |
| 2,678,926 | 5/1954 | Smith | 260—243 |
| 2,766,235 | 10/1956 | Cusic | 260—243 |
| 2,787,617 | 4/1957 | Cusic et al. | 260—243 |
| 2,827,459 | 3/1958 | Horclois et al. | 260—243 |
| 2,838,507 | 6/1958 | Cusic et al. | 260—243 |
| 2,889,322 | 6/1959 | Jacob et al. | 260—243 |
| 2,899,431 | 8/1959 | Sherlock | 260—243 |
| 2,902,484 | 9/1959 | Horclois | 260—243 |
| 2,921,069 | 1/1960 | Ullyot | 260—243 |
| 2,928,767 | 3/1960 | Gulesich et al. | 260—243 |

FOREIGN PATENTS 293   8/1955   Republic of South Africa.

WALTER A. MODANCE, *Primary Examiner.*

H. J. LIDOFF, DUVAL T. McCUTCHER, IRVING MARCUS, *Examiners.*

E. K. MERKER, JOHN D. RANDOLPH,
*Assistant Examiners.*